United States Patent [19]
Demarmels et al.

[11] Patent Number: 5,236,973
[45] Date of Patent: Aug. 17, 1993

[54] ELECTRICAL INSULATOR

[75] Inventors: Anton Demarmels, Forch; Leopold Ritzer, Neuenhof, both of Switzerland

[73] Assignee: Asea Brown Boveri Ltd., Baden, Switzerland

[21] Appl. No.: 863,470

[22] Filed: Apr. 2, 1992

Related U.S. Application Data

[63] Continuation of Ser. No. 506,187, Apr. 9, 1990, abandoned.

[30] Foreign Application Priority Data

Apr. 7, 1989 [CH] Switzerland .......................... 1310/89
Feb. 20, 1990 [CH] Switzerland ............................ 536/90

[51] Int. Cl.$^5$ ............................................. C08L 83/16
[52] U.S. Cl. .................................... 523/201; 523/436; 523/457; 523/458; 523/459; 523/514; 523/515; 523/516; 523/522; 523/526; 174/137 B
[58] Field of Search ................: 523/201, 436, 457, 458, 523/459, 514, 515, 516, 522, 526

[56] References Cited

U.S. PATENT DOCUMENTS

| | | | |
|---|---|---|---|
| 4,026,970 | 5/1977 | Backderf et al. | 525/221 |
| 4,102,851 | 7/1978 | Luck et al. | 523/457 |
| 4,104,238 | 8/1978 | Chenoweth et al. | 523/220 |
| 4,433,081 | 2/1984 | Britsch | 523/457 |
| 4,478,963 | 10/1984 | McGarry | 523/205 |

*Primary Examiner*—Paul R. Michl
*Assistant Examiner*—John J. Guarriello
*Attorney, Agent, or Firm*—Burns, Doane, Swecker & Mathis

[57] ABSTRACT

An electrical insulator including a thermosetting matrix and a filler composed primarily of powdered material embedded in the thermosetting matrix. The insulator has a high service life in spite of severe mechanical stressing at temperatures of up to 105° C. This is achieved as a result of the thermosetting matrix having a glass transition temperature exceeding 140° C. and the inclusion of a powdered filler, which has a reduced rigidity compared with the thermosetting matrix, embedded in the thermosetting matrix.

21 Claims, 2 Drawing Sheets

ELECTRICAL INSULATOR

This application is a continuation of application Ser. No. 07/506,187, filed Apr. 9, 1990 now abandoned.

BACKGROUND OF THE INVENTION

The invention is based on an electrical insulator. Such an insulator is used in medium-voltage and high-voltage engineering as a mechanically and thermally highly-loaded part such as, for example, a pressure-stressed arcing chamber housing of compressed-gas circuit breakers or a compartmental insulator in gas-insulated metal-encased switching stations. Since filler-reinforced thermosets having glass transition temperatures of up to approximately 120° C. are used as material for said insulator, such an insulator can be exposed to temperatures of not more than 85° C. if highly stressed mechanically during continuous operation. Although thermosets with higher glass transition temperatures are known, these materials are very brittle and are therefore not suitable for use in a mechanically-stressed electrical insulator.

DISCUSSION OF BACKGROUND

Electrical insulators of the type mentioned in the preamble are known, for example, from DE 3,146,003 A1 and DE 3,532,963 A1. Said insulators are in direct contact with current-carrying parts of an electrical installation and therefore heat up as a consequence of the Joule heat produced in the current-carrying parts during operation of the installation. Since the maximum permissible continuous operating temperature of these insulators, which are normally produced from mineral-powder-reinforced epoxy resin systems, is approximately 85° C. with simultaneous mechanical stressing, undesirably low limits are set on the nominal current levels which can be transmitted by the installation.

From U.S. Pat. No. 4,026,970 it is known to increase the strength of filler-reinforced thermosets by means of elastic particles having a predominantly elastomeric core and a rigid envelope surrounding the core. Nothing is, however, stated about the long-term behavior of such materials at elevated temperatures.

Further prior art is contained in the publications listed below:

R. J. Young, D. L. Maxwell, A. J. Kinloch, "The deformation of hybrid-particulate composites", Journal Of Materials Science 21 (1986) 380–388.

Prospectus on "Paraloid" issued by Rohm and Haas Company, Independence Mall West, Philadelphia, PA 19105, USA.

Patent reports, "Thermoplastische PolyesterFormmassen mit hoher Zähigkeit" ("Thermoplastic polyester molding compounds with high strength"), EP 0,131,202 B1, Patent holder: Bayer AG, Leverkusen, Kunstoffe 78 (1988) 10.

SUMMARY OF THE INVENTION

Accordingly, one object of this invention is to provide an electrical insulator which is distinguished by high service life despite severe mechanical stressing even at temperatures up to 105° C.

The insulator according to the invention still has a long service life when severely stressed mechanically even at temperatures of 105° C. It can therefore advantageously be used, for example, as a compartmental insulator or postinsulator in gas-insulated metal-encased switching stations or as an arcing chamber insulator in pressurized-gas circuit breakers. Installations and components provided with the insulator according to the invention can be of comparatively compact construction since such installations and components are operated at higher temperatures and can therefore carry higher nominal currents than comparable installations or components having insulators according to the prior art.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
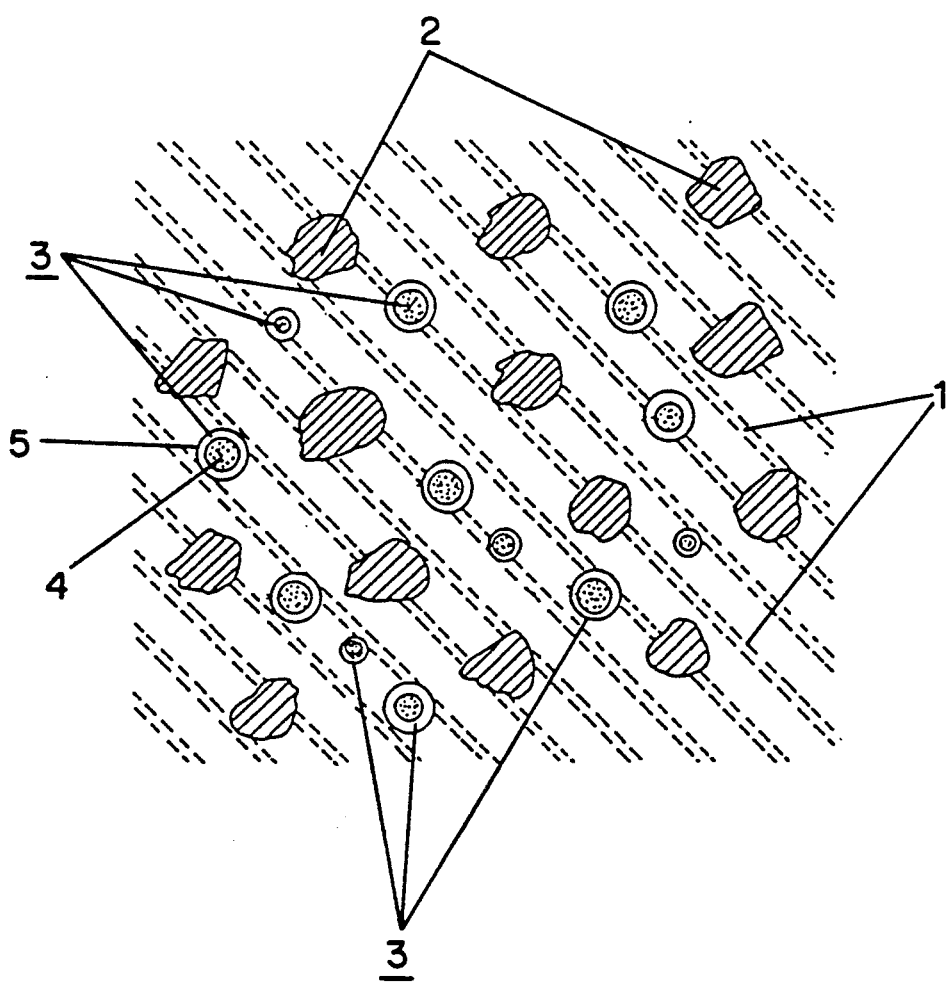
FIG. 1 shows a view of a section through a typical part of the insulating material of an electrical insulator according to the invention.

Referring now to the drawings, 1 in FIG. 1 denotes a thermosetting matrix of the electrical insulator in which particles 2 composed predominantly of mineral material and particles 3 having a rigidity which is substantially, for example at least 5–10 times, reduced compared with the thermosetting matrix 1 are embedded.

The thermosetting matrix comprises a cured casting resin based, for instance, on epoxide or polyester and has a glass transition temperature $T_G$ exceeding 140° C. A suitable starting material for the thermosetting matrix is, for example, a resin-hardener system which is marketed under the trade name Araldite CY 225 and HY 1102 by Ciba-Geigy and which comprises an epoxy resin based on bisphenol A and a hardener based on a dicarboxylic acid. In addition to this, an accelerator marketed by Ciba-Geigy under the trade name DY 062 and based on a tertiary amine was used.

The particles 2 are essentially powdered mineral fillers, for instance based on one or more of the materials such as flours of quartz, corundum, titanium dioxide or dolomite, common in casting resin technology. The filler component will in general be 50–70, optionally, however, up to 80, percent by weight of the total weight of the insulator. The upper limit of the filler component is determined by the processability (castability) of the resin-hardener system containing the filler. A quartz flour marketed under the trade name W 10 by Sihelco and having sizes of the particle 2 of up to 130 $\mu$m has proved particularly successful as filler.

The particles 3 preferably comprise in each case an elastically deformable core 4 composed of elastomeric material and a hard envelope 5 surrounding the core 4. Particles 3 formed in this manner are marketed by Rohm and Haas under the trade name Paraloid EXL 2607 (Paraloid is a registered mark of Rohm and Haas Co., Philadelphia, USA). These are particles comprising rubber particles which are coated with methyl methacrylate and have a particle diameter of approximately 0.1 to 1 $\mu$m. Instead of such reinforced rubber particles, rubber particles without reinforcement based, for instance, on polybutadiene, or particles composed of comparatively elastic thermoplastics such as, for instance, polyamides, may also be used. As shown in FIG. 1, the particles 3 can be smaller in size than the particles 2.

EXEMPLARY EMBODIMENT 1

To produce a first embodiment of the insulator according to the invention, the starting substances listed below were used:

|  | Parts by weight |
|---|---|
| Epoxy resin Araldite Cy 225 | 100 |
| Hardener HY 1102 | 90 |
| Accelerator DY 062 | 0.2 |
| Paraloid EXL 2607 filler | 10 |
| Quartz flour W10 filler | 300 |

The epoxy resin was first mixed with the hardener and the accelerator at room temperature for 5 min. Then the Paraloid EXL 2607 filler, which had been pre-dried beforehand at 80° C. for 16 h, was added in portions at that temperature and mixed for 5 min. Then the mineral filler quartz flour 2 was gradually added in batches (after drying beforehand at 160° C./16 h) at about the same temperature and mixed for a further 10 min. Steps were taken to ensure that the final mixture was kept at a temperature of 80° C. Then the mixture was exposed for 10 min to a vacuum having a residual pressure within the limits from 2 to 5 mbar. Attention was paid to homogeneity and freedom from bubbles in the material. A casting mold was now brought to a temperature of 80° C. and the material was cast at this temperature. The filled casting mold was then exposed for 10 min to a vacuum having a residual pressure of 5 to 10 mbar. The gelation and the curing process were carried out at normal pressure for 4 h at 80° C. and for 16 h at 140° C.

After curing and cooling, tensile samples and flexural bodies notched on one side were formed from the material of the insulator.

In a corresponding manner, specimens without the addition of particles 3 and specimens composed of material of insulators according to the prior art were prepared. Table 1 below shows the glass transition temperatures $T_G$ and, at various test temperatures T, the fracture toughness $K_{IC}$ and the tensile strength $\sigma_F$ of all the specimens.

TABLE 1

|  | Test Temperature T | Material of an insulator according to the prior art | Material of an insulator without addition of particles 3 | Material of an insulator with addition of particles 3 |
|---|---|---|---|---|
| $T_G$ [°C.)] |  | 119 | 151 | 146 |
| $K_{IC}$ | 23° C. | 2.1 | — | 1.8 |
| [MPam-½] | 85° C. | 2.0 | 1.3 | 1.9 |
|  | 105° C. | 2.0 | 1.3 | 1.8 |
| $\sigma_F$ | 23° C. | 86 | 74 | 67 |
| [MPa] | 85° C. | 66 | 60 | 57 |
|  | 105° C. | 40 | 57 | 50 |

It is evident that the insulator according to the invention exhibits a fracture toughness $K_{IC}$, which is approximately 40–50% higher than that of a corresponding insulator which is, however, manufactured without the addition of particles 3 and it can therefore be used as a mechanically highly-stressed component such as, for instance, an arcing chamber insulator of an $SF_6$ power switch or a compartmental insulator in a gas-insulated metal-encased switching station.

The insulator according to the invention has approximately the same tensile strength and fracture toughness as conventionally used insulators according to the prior art. Such insulators have, however, a thermosetting matrix having a glass transition temperature which makes possible a working temperature of only 85° C., while the insulator according to the invention is able to absorb almost the same mechanical loadings even at a working temperature of 105° C.

As is explained below with reference to the creep diagram according to FIG. 2, the insulator according to the invention is able to absorb high mechanical loadings at working temperatures of 105° C. and, in addition, over a long period of time. In the creep diagram, associated pairs of values of stress $\sigma$ and loading duration t until fracture of the specimen are plotted as creep strength curves a(85° C.), a(105° C.), b(105° C.), c(105° C.) and d(105° C.). In this case, the creep strength curves a(85° C.) and a(105° C.) relate to a specimen according to the prior art having a glass transition temperature of 119° C., which specimens were tested at 85° C. and 105° C. respectively. The creep strength curve b(105° C.) relates to a specimen without particles 3 added and having a glass transition temperature of 151° C., which specimen was tested at 105° C. The creep strength curves c(105° C.) and d(105° C.) relate to a specimen with elastic particles 3 added having particle sizes less than 1 μm and of approximately 5 μm, which specimen was tested at 105° C. In this case, all the specimens are, of course, similarly shaped and exhibit in each case identical additions of mineral filler, i.e., of quartz flour according to the Exemplary Embodiment 1.

Figure 2:
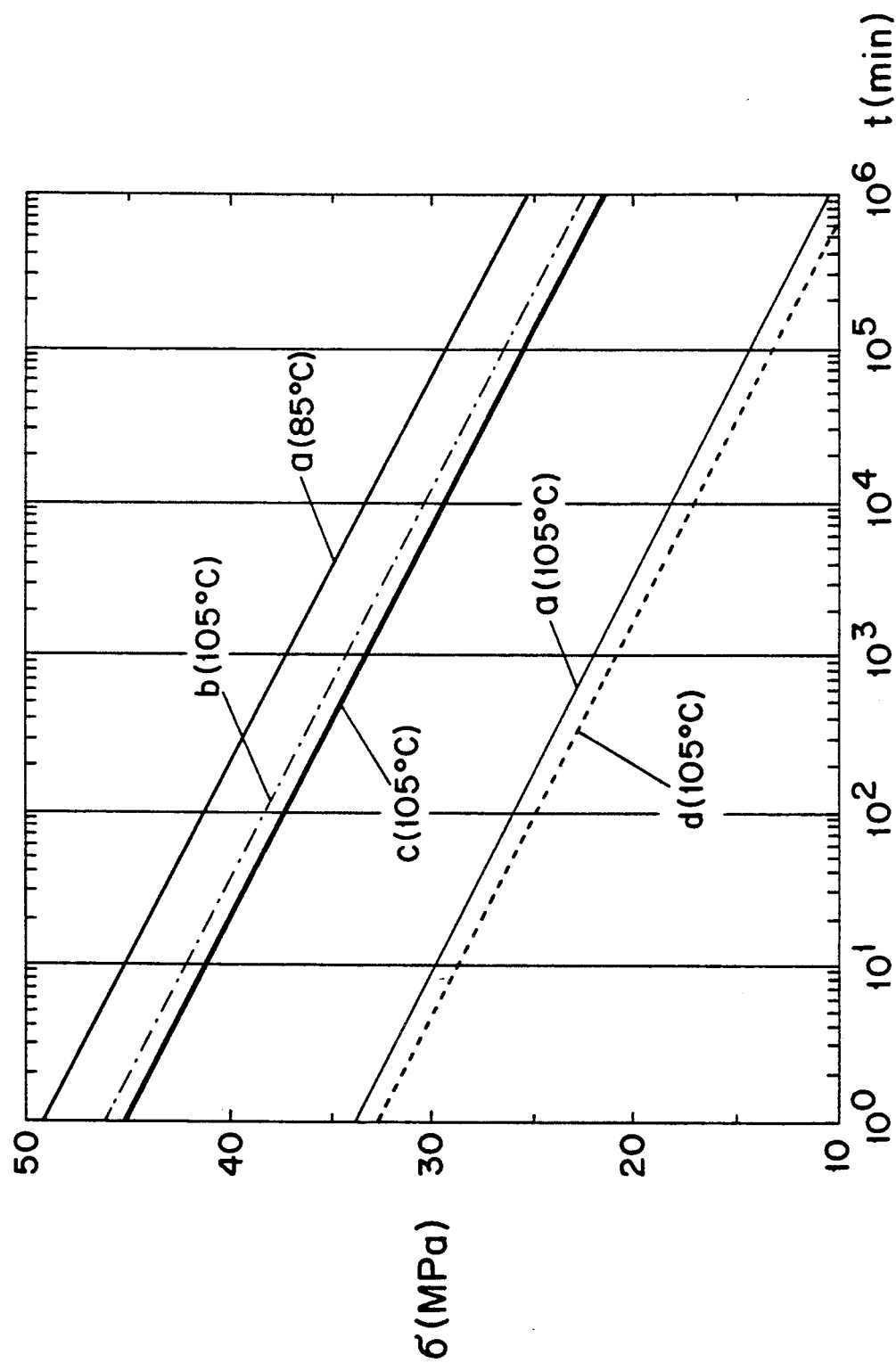
FIG. 2 shows a creep diagram of specimens of tensile creep tests, which specimens have been molded from material of insulators according to the invention and of material of comparison insulators.

From the creep diagram according to FIG. 2, it is evident that the service life, indicated by the creep strength curve c, of a specimen produced from the material of an insulator according to the invention has almost the same service life at 105° C. with stress loading as a specimen according to creep strength curve b with the same high-temperature-resistant thermosetting matrix but, according to Table 1, with a substantially reduced fracture toughness. Compared with a specimen produced from the material of an insulator according to the prior art, it has, however, a service life prolonged by several orders of magnitude at a test temperature of 105° C. Since the service life according to the creep strength curve d(105° C.) drops drastically for a specimen having diameters of the elastic particles 3 exceeding 5 μm, it is advisable, when producing an insulator according to the invention, to keep the diameters of the elastic particles 3 less than 5 μm, preferably even less than 1 μm.

EXEMPLARY EMBODIMENTS 2–4

In further exemplary embodiments, insulators according to the invention were produced in accordance with Exemplary Embodiment 1 and tested for their material properties. From Table 2 shown below, in which the composition and the mechanical properties of the materials of these insulators are indicated, it emerges that the insulator according to the invention is not limited to only quartz flour as mineral filler but that other fillers such as corundum flour or titanium dioxide flour can also readily be used, even in different added amounts.

TABLE 2

| Starting substances | Parts by Weight Sample | | |
| --- | --- | --- | --- |
| | 2 | 3 | 4 |
| Araldite CY 225 | 125 | 82 | 75 |
| Hardener HY 1102 | 110 | 75 | 70 |
| Accelerator DY 062 | 0.3 | 0.2 | 0.2 |
| Paraloid EXL 2607 | 15 | 8 | 5 |
| Corundum flour (Al$_2$O$_3$) | 400 | 335 | — |
| Titanium dioxide flour (TiO$_2$) | — | — | 350 |
| Tensile strength [MPa] | 65 | 60 | 50 |
| Fracture toughness [MPam-$\frac{1}{2}$] | 2.0 | 1.8 | 1.5 |

In all the exemplary embodiments, the addition of the elastic particles 3 through the casting resin system did not impair either the processing properties of the resin system nor was there a larger reaction shrinkage in producing large-volume insulators than in producing reference insulators according to the prior art with comparatively low glass transition temperatures. As shown in Tables 1 and 2, the first particles 2 can be present in amounts at least 25 times by weight greater than the amount of the second particles 3.

Obviously, numerous modifications and variations of the present invention are possible in the light of the above teachings. It is therefore to be understood that within the scope of the appended claims, the invention may by practiced otherwise than as specifically described herein.

What is claimed as new and desired to be secured by Letters Patent of the United States is:

1. An electrical insulator for use as a mechanically and thermally, highly-loaded part in medium or high voltage equipment comprising a thermosetting matrix having a glass transition temperature exceeding 140° C., first particles embedded in the thermosetting matrix and composed predominantly of mineral filler having a particle size no greater than 130 microns, and second particles smaller than the first particles, the second particles being embedded in the thermosetting matrix as additional filler and having a reduced rigidity compared with the thermosetting matrix, the insulator containing a greater amount by weight of the first particles than the second particles, and the second particles being smaller than 5 μm.

2. The insulator as claimed in claim 1, wherein the second particles each have at least in part an elastically deformable core and a stiff envelope surrounding the core and acting as reinforcement.

3. The insulator as claimed in claim 1, wherein the second particles are produced at least on part from thermoplastic material such as polyamide.

4. The insulator as claimed in claim 1, wherein the second particles are each produced at least in part from elastomeric material.

5. An electrical insulator for use as a mechanically and thermally, highly-loaded part in medium or high voltage equipment comprising a thermosetting matrix based on an epoxide cured resin having a glass transition temperature exceeding 140° C., first particles embedded in the thermosetting matrix and composed predominantly of mineral filler having a particle size no greater than 130 microns, and second particles smaller than the first particles, the second particles being embedded in the thermosetting matrix as additional filter and having a reduced rigidity compared with the thermosetting matrix, the insulator contianing a greater amount by weight of the first particles than the second particles, the additional filler having particle sizes no larger than 1 μm and making up not more than 15 percent by weight of an amount of casting resin required to form the thermosetting matrix, the first particles comprising particles selected from the group consisting of quartz, corundum, titanium dioxide and dolomite and comprising 50 to 80 percent by weight of the insulator.

6. The insulator as claimed in claim 5, wherein the additional filler makes up at least 5 percent by weight of the amount of casting resin.

7. The insulator as claimed in claim 1, wherein the second particles are no larger than 1 μm.

8. The insulator as claimed in claim 1, wherein the insulator comprises a mechanically loaded and thermally-loaded part of medium/high voltage equipment.

9. The insulator as claimed in claim 1, wherein the insulator comprises a pressure-stressed part exposed to temperatures of at least 105° C.

10. The insulator as claimed in claim 1, wherein the matrix comprises an epoxide or polyester cured resin.

11. The insulator as claimed in claim 1, wherein the matrix comprises an epoxide cured resin based on bisphenol A and a hardener based on dicarboxylic acid.

12. The insulator as claimed in claim 1, wherein the matrix comprises a cured resin which includes an accelerator based on a tertiary amine.

13. The insulator as claimed in claim 1, wherein the first particles comprise 50 to 80 wt. % of the insulator.

14. An electrical insulator for use as a mechanically and thermally, highly-loaded part in medium or high voltage equipment comprising a thermosetting matrix having a glass transition temperature exceeding 140° C., first particles embedded in the thermosetting matrix and composed predominantly of mineral filler, and second particles smaller than the first particles, the second particles being embedded in the thermosetting matrix as additional filler and having a reduced rigidity compared with the thermosetting matrix, the insulator containing a greater amount by weight of the first particles than the second particles, the second particles being smaller than 5 μm, the first particles comprising particles selected from the group consisting of quartz, corundum, titanium dioxide and dolomite, and the first particles having a particle size no greater than 130 microns.

15. The insulator as claimed in claim 1, wherein the insulator exhibits resistance to mechanical loading at temperatures of at least 105° C.

16. The insulator as claimed in claim 14, wherein the insulator contains at least 25 times more by weight of the first particles than the second particles.

17. The insulator as claimed in claim 1, wherein the insulator comprises a housing of an electrical component.

18. An electrical insulator for use as a mechanically and thermally, highly-loaded part in medium or high voltage equipment comprising a thermosetting matrix having a glass transition temperature exceeding 140° C., first particles and second particles embedded in the thermosetting matrix, the first particles being composed predominantly of mineral filler having a particle size no greater than 130 microns, the second particles being smaller than the first particles and having a reduced rigidity compared with the thermosetting matrix, the insulator containing a greater amount by weight of the first particles than the second particles, the first particles comprising 50 to 80 wt. % of the insulator and the second particles comprising up to 15 wt. % of casting resin required to form the thermosetting matrix, and the second particles being smaller than 5 μm.

19. The insulator as claimed in claim 18, wherein at lest part of each of the second particles comprise elastomeric material.

20. The insulator as claimed in claim 18, wherein the second particles are no larger than 1 μm.

21. The insulator as claimed in claim 18, wherein the first particles comprise particles selected from the group consisting of quartz, corundum, titanium dioxide and dolomite, the first particles have a mean particle size of about 40–50 μm and the second particles have a mean particle size of no greater than about 1 μm.

* * * * *